United States Patent [19]

Burkholder et al.

[11] 4,421,651

[45] Dec. 20, 1983

[54] METHOD OF RECOVERING ADSORBED LIQUID COMPOUNDS FROM MOLECULAR SIEVE COLUMNS

[75] Inventors: Harvey R. Burkholder; Glenn E. Fanslow, both of Ames, Iowa

[73] Assignee: Iowa State University Research Foundation, Inc., Ames, Iowa

[21] Appl. No.: 382,960

[22] Filed: May 28, 1982

[51] Int. Cl.³ ............................................. B01J 20/34
[52] U.S. Cl. .................................... 210/672; 210/689; 210/691; 502/56
[58] Field of Search ........................ 55/25, 33, 75, 389; 210/670, 672, 673, 689–691, 748, 269; 568/917; 252/411 R

[56] References Cited

U.S. PATENT DOCUMENTS

| | | | |
|---|---|---|---|
| 4,157,267 | 6/1979 | Odawara et al. | 127/46.1 |
| 4,277,635 | 7/1981 | Oulman et al. | 568/917 |
| 4,312,640 | 1/1982 | Verrando | 55/33 |
| 4,312,641 | 1/1982 | Verrando et al. | 55/33 |
| 4,322,394 | 3/1982 | Mezey et al. | 55/33 |

FOREIGN PATENT DOCUMENTS 2477036 9/1981 France .

Primary Examiner—Ivars C. Cintins

[57] ABSTRACT

Molecularly adsorbed volatile liquid compounds are recovered from molecular sieve adsorbent columns by directionally applying microwave energy to the bed of the adsorbent to produce a mixed liquid-gas effluent. The gas portion of the effluent generates pressure within the bed to promote the discharge of the effluent from the column bottoms. Preferably the discharged liquid-gas effluent is collected in two to three separate fractions, the second or intermediate fraction having a substantially higher concentration of the desorbed compound than the first or third fractions. The desorption does not need to be assisted by passing a carrier gas through the bed or by applying reduced pressure to the outlet from the bed.

12 Claims, 8 Drawing Figures

BEGINNING OF FIRST DESORPTION CYCLE (RECYCLE)

FIRST DESORPTION CYCLE

MIDDLE OF FIRST DESORPTION CYCLE (INTERMEDIATE PRODUCT)

SECOND DESORPTION CYCLE

METHOD OF RECOVERING ADSORBED LIQUID COMPOUNDS FROM MOLECULAR SIEVE COLUMNS

CONTRACT REFERENCE

This invention was made in part under Department of Energy Contract No. W-7405-ENG-82.

BACKGROUND AND PRIOR ART

U.S. Pat. No. 4,277,635, issued July 7, 1981 describes a process for recovering and concentrating ethanol from aqueous solutions containing the ethanol at a lower concentration. For example, the method can be employed, using single or multiple concentration stages, as required, to produce a concentrated ethanol product of 80–95% ethanol, or greater, from an aqueous fermentation beer containing from 1–15% ethanol. The aqueous ethanol feed to be concentrated is passed through a bed of a crystalline silica polymorph capable of selectively adsorbing ethanol from aqueous solutions thereof. Silicalite is indicated as a preferred adsorbent for this purpose. The ethanol is selectively adsorbed in the molecular pore spaces of the porous granules containing the molecular sieve adsorbent. At the conclusion of the adsorption cycle, the disclosure of U.S. Pat. No. 4,277,635 indicates that the bed should be drained to remove excess feed which will be present in the void spaces between the adsorbent granules as well as in the head space above the granular bed. After drainage of the excess liquid, desorption of the ethanol is obtained by passing a heated inert gas, such as carbon dioxide, through the bed. As the passage of the heated gas continues, the granules are heated and the ethanol is evolved as a gas, which is carried out with the carbon dioxide. The ethanol is recovered from the effluent gas by condensation to a liquid.

The ethanol desorption procedure described above has been found to be relatively inefficient. The molecularly adsorbed ethanol is contained within the pore spaces of the adsorbent granules, and the granules are relatively poor conductors of heat. The heat from the carrier gas, or other auxillary heating means if one is used, therefore takes a considerable time to heat the interior portions of the granules to temperatures at which the adsorbed ethanol is vaporized. Further, the rate at which the ethanol is evolved from the granules depends on the rate of diffusion through the capillary passages of the granules, which is a rate limited process. A related disadvantage of the desorption procedure using a heated carrier gas is that the desorption is incomplete. The ethanol remaining molecularly adsorbed within the granules therefore reduces the capacity of the granules for the next adsorption cycle. This means in practice that a larger amount of adsorbent must be used than the theoretical minimum based on the adsorption capacity of the granules, and this increases the cost of the recovery process. Also it has been found that the carrier gas tends to remain within the pore spaces of the granules, being difficult to remove therefrom, and that this residual gas within the porous granules also reduces the capacity of the granules on the next adsorption cycle.

SUMMARY OF INVENTION

This invention relates to the recovery of volatile liquid compounds molecularly adsorbed within porous granules of a molecular sieve adsorbent, the granules being arranged in a vertically-extending bed contained in a column providing access port means communicating respectively with the upper and lower portions of the bed. During the experimental work which led to the present invention, it was discovered that microwave heating of the absorbent bed adsorbed volatile compound, and make it possible to produce a final product of very high concentration. Because of the efficient use of the adsorbent beds in the method of this invention, smaller size columns and beds of lower construction and maintenance cost can be utilized to produce a product of a desired high concentration.

THE DRAWINGS

The method of this invention is illustrated in preferred embodiments in the accompanying drawings, in which.

DETAILED DESCRIPTION

Figure 1:
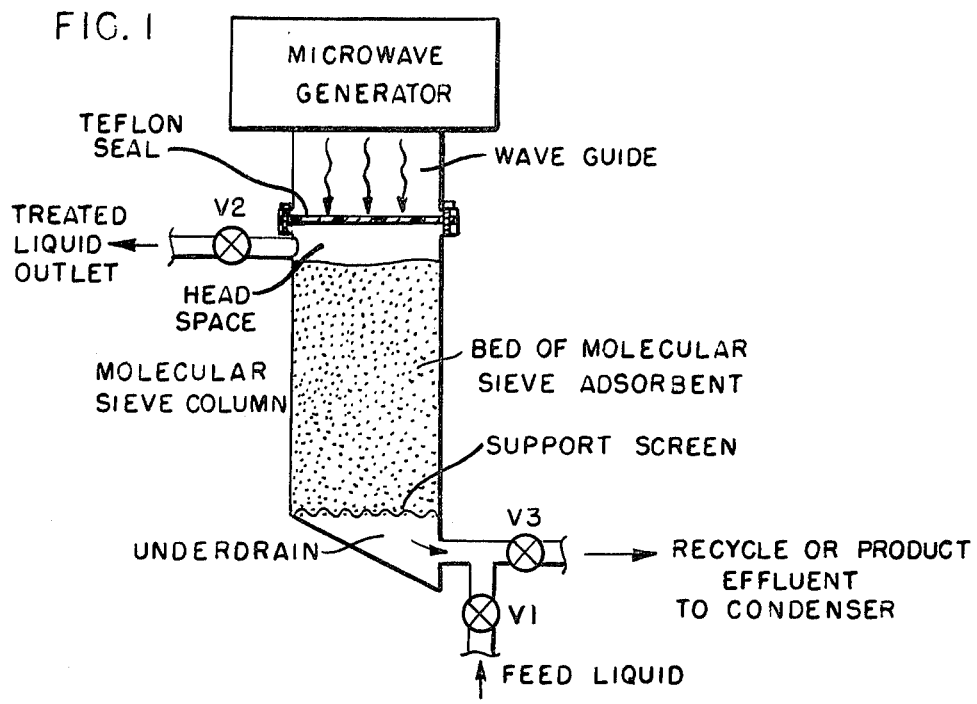
FIG. 1 is a cross-sectional view of an apparatus which may be used in practicing the method of this invention, including a molecular sieve column having walls forming a wave guide, a microwave generator for applying microwave energy to the top of the adsorbent bed within the column, and valve-controlled inlets and outlets.

The desorption method of this invention can be used with most molecular sieve adsorbents and with most liquids which are capable of molecularly adsorbing. The preferred molecular sieve adsorbents are those having a low dielectric loss compared to that of the adsorbed liquid. Two important classes of such adsorbents are: (1) the hydrophobic crystalline silica polymorph adsorbents, and (2) the hydrophilic crystalline zeolite molecular sieve adsorbents. Silica polymorph adsorbents are described in U.S. Pat. Nos. 4,061,724 and 4,073,965. A commercial form of this kind of adsorbent is known by the generic name of "silicalite". Silicalite adsorbents can be obtained from the Linde Division of Union Carbide Corporation, Tarrytown, N.Y. They are produced as described in U.S. Pat. No. 4,061,724. More recently, silicalite-type adsorbents have been proposed which are silica analogues of the silica-rich aluminosilicate zeolites. See Flanigen et al, "Silicalite a New Hydrophobic Crystalline Silica Molecular Sieve", *Nature*, 271, 512–516 (1978). The zeolite-type molecular sieve adsorbents are crystalline aluminosilicate compounds. They are described in U.S. Pat. Nos. 3,702,886 and 3,709,979, and also in Lee, H., "Applied Aspects of Zeolite Adsorbents", in *Molecular Sieves*, 311–317, 3rd Int. Molecular Sieve Conf., Zurich, Switzerland (September, 1973).

For use as adsorbents, such as in column adsorption processes, the crystalline molecular sieve adsorbents are prepared in the form of granules or pellets. Suitable binders may be used to hold together the particles of the crystalline adsorbents. The resulting granular adsorbents are highly porous, providing a multiplicity of capillary passages which connect with the adsorption pore spaces of the silicalite or other molecular sieve adsorbent. These granular molecular sieve adsorbents have relatively low heat conductivity with respect to the transfer of heat from the surfaces of the granules to the interiors thereof. Further, the preferred class of molecular sieve adsorbents and the granules formed therefrom are relatively poor absorbers of microwave energy, that is, their dielectric loss factors are low and consequently the power absorbed from applied microwave energy is low. A liquid compound adsorbed within the molecular sieve granules can thereby be heated sufficiently to vaporize and expel gas and liquid while the granules remain at a much lower temperature. For example, in connection with the development of this invention, it has been estimated that the selective microwave heating of adsorbed ethanol on silicalite is such that the ethanol is heated at a rate over 3,000 times greater than the silicalite. Similarly, water adsorbed on a zeolite adsorbent will be heated at a rate several thousand times faster than the zeolite. In general, therefore, the heating of adsorbed liquids within molecular sieve granules will be greater by several orders of magnitude than the adsorbent granules, the heating of which is limited by their low capacity for absorbing microwave energy and by the low rate of heat conduction through the granules.

From what has already been said, it should be apparent that the desorption method of this invention can be applied to a broad class of volatile liquids adsorbed within molecular sieve adsorbent granules. The molecular sieve compound forming the granules will be selected in relation to the kind of liquid to be adsorbed, and with respect to the relative dielectric loss factors, as discussed above. For adsorption of small molecular size organic compounds from water, such as ethanol from a fermentation beer, a silicalite-type adsorbent can be used, while for adsorption of water from admixture with an organic solvent, such as concentrated aqueous ethanol, a zeolite-type adsorbent can be used. The desorption method of this invention is therefore believed to be particularly useful in preparing highly concentrated ethanol. A column of silicalite adsorbent can be used, as described in U.S. Pat. No. 4,277,635, to prepare a concentrate containing a small amount of water, such as 5% or less water. The ethanol can then be further dehydrated in a zeolite column to prepare the final substantially water-free ethanol. In commercial applications, adsorption can be performed in single or multiple stages. For example, the ethanol from the fermentation beer can be initially concentrated to 50–60% ethanol, and thereafter concentrated in a second stage also using a silicalite adsorbent column to a concentration of 80–95%. Similarly, the further dehydration using a zeolite molecular sieve column can be carried out in single or multiple stages with progressive decrease in the water content of the ethanol.

Figure 2:
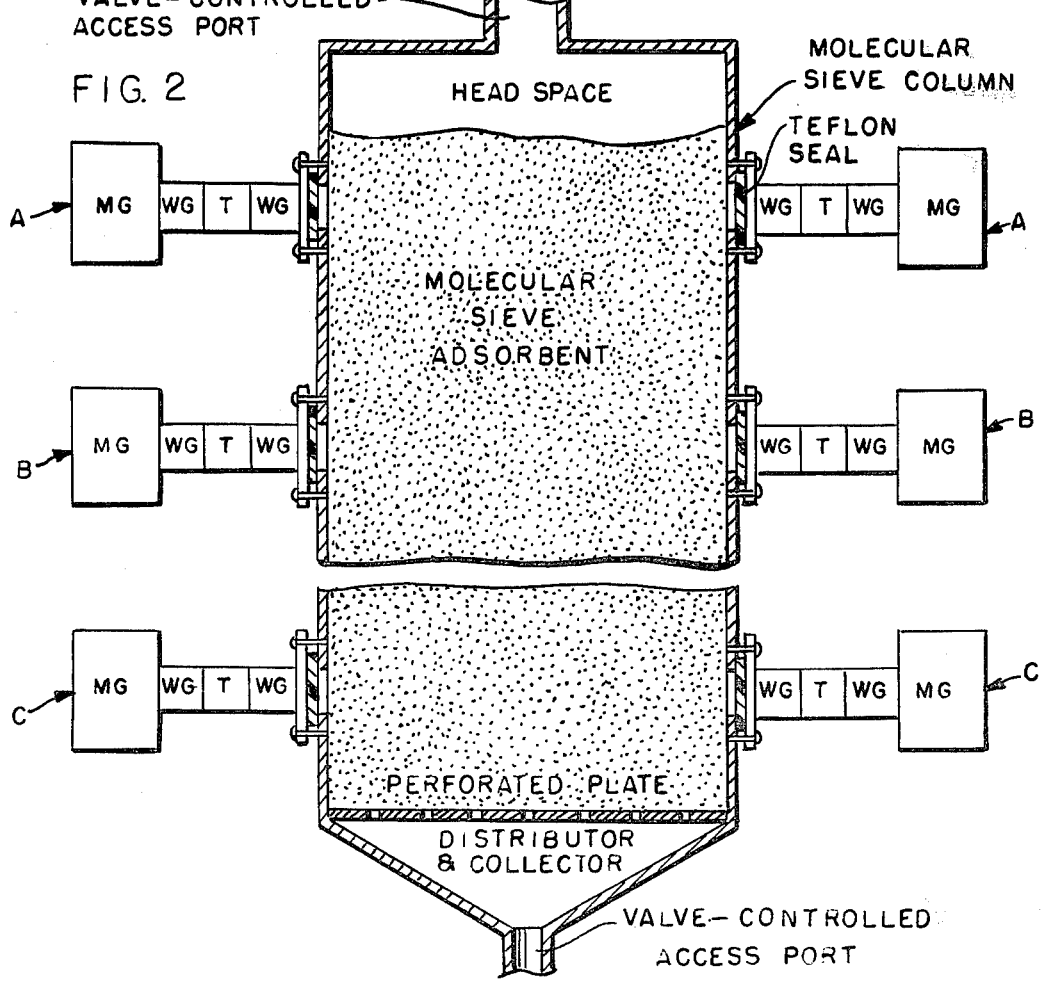
FIG. 2 is a diagrammatic cross-sectional view of a larger apparatus which may be used in practicing the method of the invention, including a large vertically-extending column containing the bed of molecular sieve adsorbent, multiple vertically-spaced microwave generators and wave guide applicators, and valve-controlled access ports.

In general, therefore, the method of this invention can be used for desorption of a volatile liquid compound molecularly adsorbed within porous granules of a molecular sieve adsorbent. The granules will be in a vertically-extending bed enclosed by a column, having access ports in upper and lower portions thereof. The column will have at least one access port in the upper portion thereof above the top of the bed of adsorbent communicating with the head space above the bed; and at least one access port in the bottom thereof communicating with the collector space beneath the bed of adsorbent. A screen or sieve plate is used to support the adsorbent bed while permitting liquids or gases to pass therethrough. The columns may, be formed of suitable corrosion-resistant metals such as stainless steel. For the purpose of the present invention, a metal column is desireable which will interiorly reflect the microwave energy applied to the bed within the column. In one suitable apparatus arrangement, as illustrated in FIG. 1, the column itself comprises a wave guide for the microwave energy being an extension of a wave guide connected to a microwave generator. Alternatively, as illustrated in FIG. 2, microwave energy can be introduced through ports in the side of the column, suitable microwave generators and wave guides being connected to these ports, which can be sealed with a suitable plastic such as Teflon, which allows microwave energy to pass through with negligible absorption. If desired, a cylindrical wave guide can be extended downwardly into the central portion of the adsorbent bed. The cylindrical wave guide can be provided with a series of slots for release of the microwave energy, the slots being sealed by a suitable plastic such as Teflon.

As shown in FIG. 1, the molecular sieve column has a rectangular cross-section, and is designed to form a wave guide. For example, the column may be a section of a WR-340 wave guide. The column-wave guide may be formed of stainless steel or other suitable metals such as brass or aluminum. As shown, the bottom of the column is closed by a downwardly inclined plate, which forms an underdrain beneath a support screen. The inclination of the bottom assists in collecting the liquid or liquid-gas mixture evolved by the desorption, and also tends to reduce the reflection of the microwave energy reaching the bottom wall of the column. The top of the column is closed by a Teflon seal, which is in the form of a horizontally-extending gasket sheet, which provides a gas and liquid seal at the top of the column above the bed of molecular sieve adsorbent. Therefore, there is an open head space above the top of the bed. Above the Teflon seal, the wave guide extends upwardly and connects with a microwave generator. The column and the extension will therefore together provide a continuous wave guide, such as a wave guide of the required design and cross-section corresponding to a standard WR-340 wave guide.

The apparatus of FIG. 1 includes a bottom inlet controlled by a valve V1 for introduction of the liquid for adsorption. In the adsorption stage, a feed liquid, such as dilute aqueous ethanol, will pass upwardly through the bed of adsorbent, such as a silicalite bed, and will pass outwardly through the access port communicating with the outlet conduit controlled by valve V2. The conduit connecting with the underdrain at the bottom of the column is an extension controlled by the valve V3 for removal of the effluent liquid and/or gas during desorption. With the apparatus shown in FIG. 1, during the adsorption stage, valves V1 and V2 will be open and valves V3 and V4 closed. The adsorption is preferably carried out in an upflow mode, the liquid for adsorption entering through valve V1 and exiting through valve V2. At the conclusion of the adsorption, the conduit connecting through valve V3 can be used as a drain conduit, the excess liquid for adsorption being drained from the bed as completely as possible by gravity draining.

Figure 3:
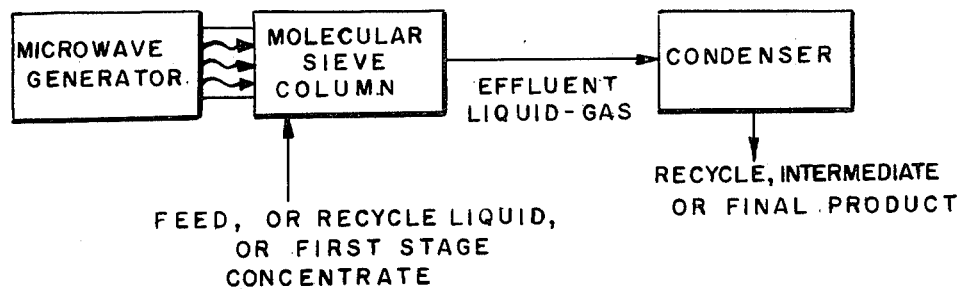
FIG. 3 is a block diagram illustrating a mode of operation of the apparatus of FIG. 1.

The desorption mode of operation of the apparatus of FIG. 1 is illustrated in general in FIG. 3. The drained bed of molecular sieve adsorbent will contain the volatile liquid compound in a molecularly adsorbed form within the granules of the bed. The microwave generator creates microwave energy which is directed downwardly onto the top of the molecular sieve bed. The granules in the upper portion of the bed are subjected to the microwave heating which partially vaporizes the adsorbed liquid (viz. ethanol with a silicalite adsorbent or water with a zeolite adsorbent). The volatilized liquid creates gas pressure within the granules which expels gas and liquid from the granules, and also creates gas pressure within the head space above the bed. The expelled liquid therefore flows downwardly through the bed into the underdrain, and a mixture of gas and liquid is removed through the valve V3. As the zone of microwave heating moves downwardly through the bed, the desorption process continues in the same manner until the adsorbed liquid has been removed from the entire bed. In this mode of operation, the bed at the start of the desorption will be at a temperature at which the adsorbed compound when separated from the granules would be entirely in a liquid state. The amount of microwave energy applied to the bed is sufficient to only partially vaporize the adsorbed compound. The effluent removed from the bed will therefore comprise a liquid-gas mixture. Only part of the recovered compound will therefore need to be condensed to obtain the product in liquid form.

As indicated in FIG. 3, the molecular sieve column may have been loaded using a liquid feed, or a recycled liquid, or a first stage concentrate. It is the adsorbed volatile compound from these liquids which is desorbed to form the liquid-gas effluent. This effluent is passed to a condenser to obtain a recycled liquid, an intermediate concentrate, or a final product. The collection of separate fractions of the effluent will be further described below in relation to FIGS. 4-8. Next, however, it is desired to make reference to the apparatus illustrated in FIG. 2, which represents an apparatus designed for use with larger columns.

The microwave energy may be applied in various other ways which also provide directional modes. One alternate design is shown in FIG. 2. In another configuration, a cylindrical wave guide is extended downwardly into the central portion of the adsorbent bed. The guide can be provided with a series of slots sealed by Teflon for release of the microwave energy in radial directions.

Referring now to the apparatus of FIG. 2, it consists of a large vertically-extending column of circular cross-section, which may be formed of stainless steel or other metal reflecting microwaves. Within the column there is provided a vertically-extending bed of the molecular sieve adsorbent. The bottom of the bed is supported by a perforated plate above a conical space which functions as a distributor for the introduction of liquid through the lower valve-controlled access port, or as a collector for the effluent removed from the bottom of the column through the same access port. The top of the bed terminates below the top of the column to provide an open head space which communicates with a valve-controlled access port. When the adsorption is carried out in an upflow mode, the feed liquid will enter through the lower access port and exit through the upper access port. For the desorption cycle, the upper access port will be closed and the lower access port open.

In the apparatus of FIG. 2, multiple independent microwave sources are employed. As shown, these microwave sources are arranged in vertically-spaced relation along opposite sides of the column. Each source consists of an apparatus including a microwave generator (MG), a wave guide (WG), and a tuner (T) interposed in wave guide. The wave guides (WG) terminate in connections to the column interior including openings or slots covered by Teflon seals to prevent escape of liquid or gas while permitting microwaves to pass into the column for irradiation of the adsorbent granules. The tuners (T) can be used to maximize power transferred to the interior of the column through the wave guides (WG). With the arrangement shown a cyclic mode of operation can be used. At the beginning of the cycle, the upper pair of sources (A) can be activated, applying the microwave energy to the upper portion of the bed. After the upper portion of the bed has been heated sufficiently to form the desorbed effluent, the next lower pair of microwave sources (B) can be activated and the upper sources (A) deactivated. The desorption will thereby proceed progressively from the top toward the bottom of the column. Depending on the height of the column and the bed, additional sources can be provided. In the final stage of the desorption, the lowermost source (C) will be activated with the other sources deactivated to complete the desorption.

The operation of the apparatus of FIG. 2 in the desorption cycle is therefore similar to the mode of operation described with respect to the apparatus of FIG. 1. The microwave energy is directionally applied so as to heat the adsorbed liquid in the upper portion of the bed and to successive portions thereof. The bed at the start of the microwave application is at a temperature at which the desorbed compound would be in a liquid state. The amount of microwave energy applied to the bed upper portion and the successive portions thereof is sufficient to only partly volatilize the desorbed compound. This permits the use of much less microwave energy than would be required to fully convert the adsorbed compound to a gas. The effluent expelled from the granules will be in a mixed liquid-gas form. The gas portion of the effluent creates a pressure within the bed above the outlet pressure (an "over pressure"), which pushes the expelled liquid portion toward the lower access port. A pressure differential is created from the head space to the outlet port. In embodiments where vacuum is not applied to the outlet, the pressure in the head space will be substantially above atmospheric. The liquid-gas effluent is recovered by removal through this port.

OPERATIONAL EXAMPLES

Figure 4:
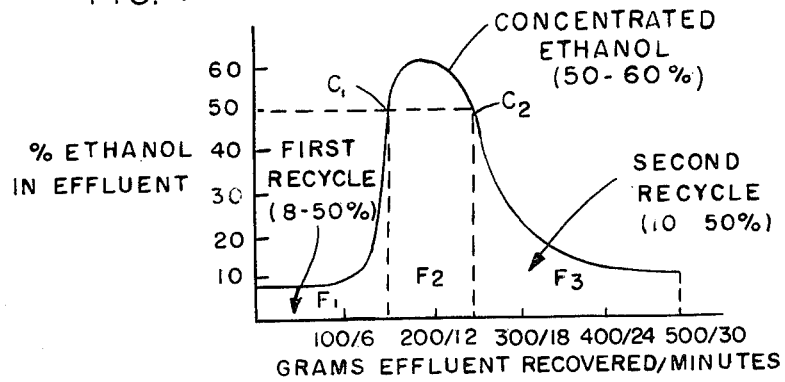
FIG. 4 is a curve representing the ethanol concentration of an effluent obtained in the recovery of ethanol from a silicalite column after passage of a dilute fermentation beer through the column.
Figure 5:
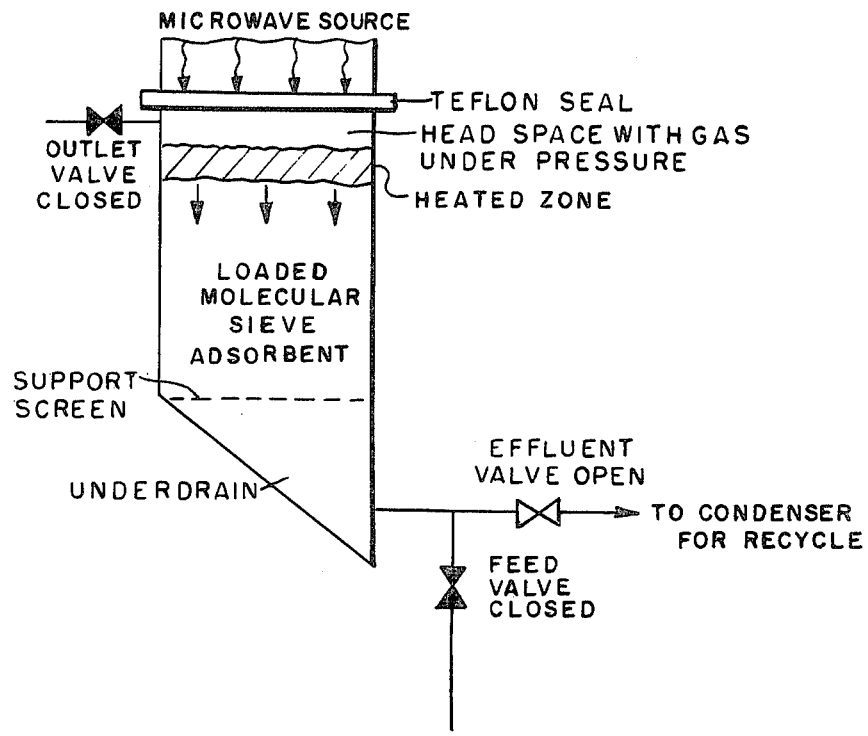
FIG. 5 is a diagramatic representation of the apparatus of FIG. 1, illustrating the beginning of a desorption cycle.

FIG. 4 represents the kind of effluent that can be expected in the first stage of desorption of ethanol when a dilute fermentation beer has been applied to a silica polymorph adsorbent such as silicalite. Even though the excess beer is drained from the column bed and, if desired, the beer removal procedure of U.S. Pat. No. 4,277,635 is employed, there will still be residual beer adsorbed within the column bed at the start of the ethanol desorption. The mixed liquid-gas effluent may initially be evolved at a concentration corresponding to that of the dilute beer, such as, 8-10% ethanol. As indicated by the curve in FIG. 4, as the desorption continues, it will increase sharply to a relatively high concentration level for an intermediate period, and then will decline more gradually to a lower concentration. With reference to the graph of FIG. 4, a first fraction F1 can be collected having a concentration of from 8 to 50% ethanol, a second fraction F2 with an ethanol concentration of 50 to 60%, and a third fraction F3 having an ethanol concentration of from 10 to 50%. It will be understood that these figures are not intended to be limiting or in any way critical but are only given for purpose of illustration. However, the curve of FIG. 2 is based on an actual experiment. The fermentation beer had an ethanol concentration of about 8%, and the intermediate produce obtained (F2) had a concentration in the range of 50–60%. The grams of effluent recovered per minute of desorption time are indicated on the lower axis of the graph. The apparatus employed was similar to that shown in FIG. 1, the microwaves being applied to the top of the bed and progressively heating the bed in a downward direction. As can be seen from FIG. 4, the recovery of the effluent was very rapid, collection of all three fractions (F1, F2, and F3) being completed in 30 minutes.

FIGS. 5 to 8 represent further more generalized examples of the desorption procedure just described with reference to FIG. 4. The apparatus employed is similar to that of FIG. 1, as indicated by the diagramatic illustrations of FIGS. 5 and 7. Looking first at FIG. 5, the beginning of the first desorption cycle is illustrated. The lower feed inlet valve and upper liquid outlet valve are closed. The microwave energy is directed onto the top of the bed to provide a heated zone within the uppermost portion of the bed. The heating is controlled to produce a mixed liquid-gas effluent. The evolved gas generates pressure within the upper portion of the bed and within the head space. This gas pressure urges the liquid-gas effluent downwardly through the bed into the underdrain for removal therefrom through the open effluent valve. The removed effluent is passed to a condenser. During the first portion of the desorption cycle, the condensed effluent will be recycled to a first adsorption stage because of its low ethanol concentration. This recycle may correspond with the fraction F1 illustrated by the curve of FIG. 6 for the first desorption cycle.

Figure 6:
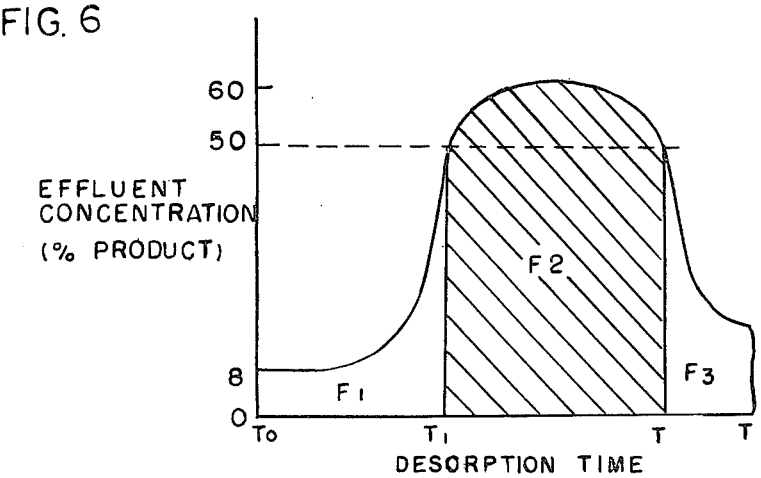
FIG. 6 shows a typical curve of a desorption cycle, effluent concentration being plotted against desorption time.
Figure 7:
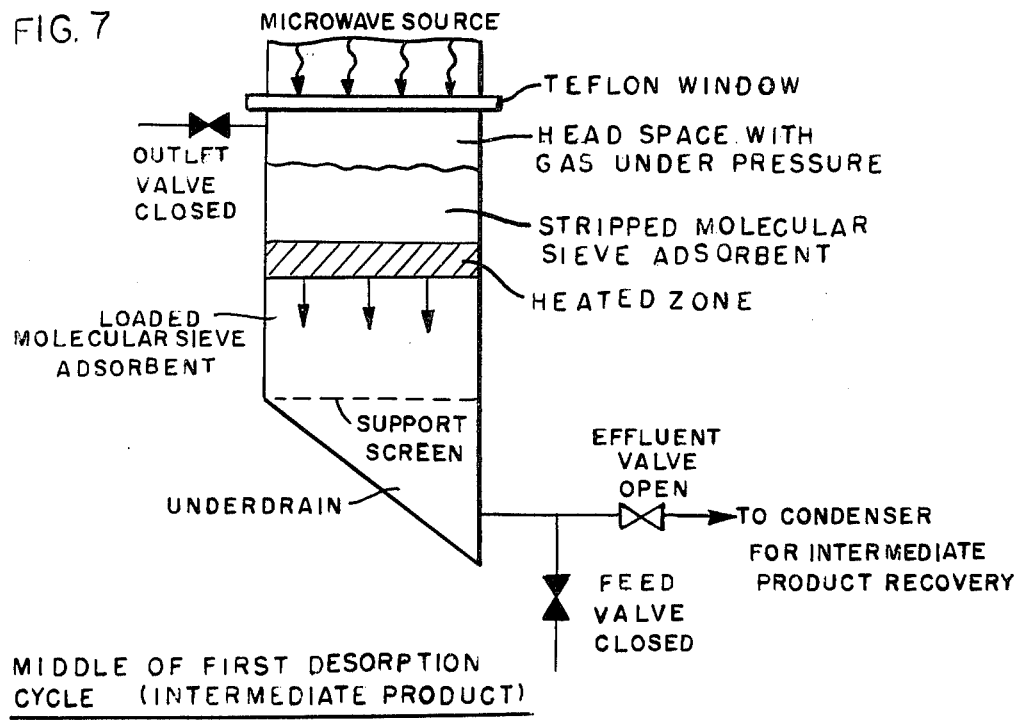
FIG. 7 is a diagramatic illustration similar to FIG. 5 representing the middle of the first desorption cycle in which a product of intermediate concentration is obtained.

FIG. 7 illustrates the middle of the first desorption cycle in which an intermediate product is produced. The arrangement of the apparatus is the same as in FIG. 5. At this time, the heated zone of the adsorbent bed in which the desorption is occurring has progressed to an intermediate level in the bed, as shown in FIG. 7. The liquid-gas effluent removed by the open effluent valve is for recovery of an intermediate concentrate. With reference to FIG. 6, this fraction may correspond to the fraction F2, which as indicated, would have a concentration of the desired product of 50–60%. If desired, the desorption can continue at a further recycle fraction (F3) collected. The intermediate concentrate, such as the condensed fraction F2, is then subjected to another adsorption-desorption cycle, using apparatus like that of FIG. 1.

Figure 8:
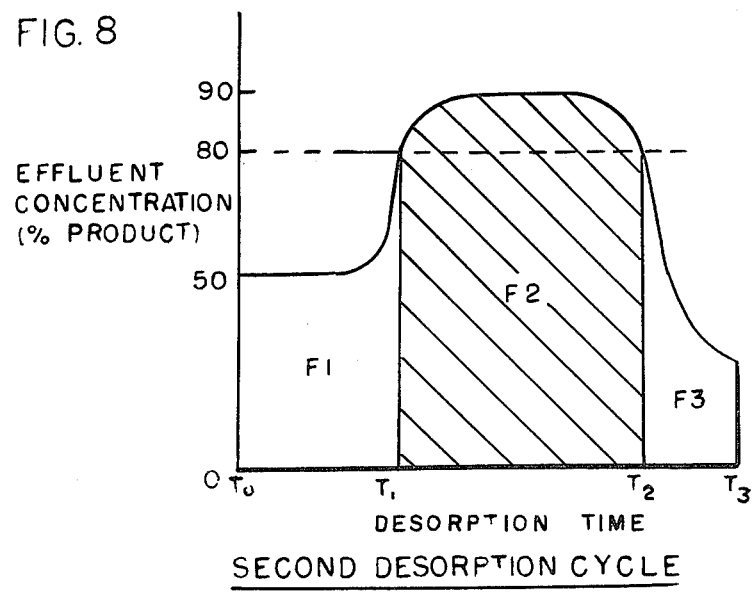
FIG. 8 is a curve showing effluent concentration plotted against desorption time for a second desorption cycle to produce a highly concentrated product.

It will be understood that the bed of adsorbent has been prepared for the next adsorption cycle by completion of desorption so that the bed has adequate adsorption capacity. After the completion of the adsorption and the draining of the bed, or other special procedures to remove dilute feed from the bed, desorption is carried out in the same manner as described with reference to FIGS. 5 and 7, that is, the microwave energy is applied to the top of the bed forming a heated zone in which the desorption occurs, the zone moving progressively down through the bed toward the bottom thereof. As shown in FIG. 8, a first fraction F1 can be collected having a concentration similar to that of the intermediate product. This fraction can then be combined with the fraction F2 of FIG. 6 to produce a combined liquid for second stage adsorption and desorption. The intermediate fraction F2, as indicated in FIG. 8, will contain the desired product in a high concentration, such as 80–90%. If desired, a further fraction F3 may be collected, which can be recycled with fresh fermentation beer in the first stage adsorption.

From an inspection of the graphs of FIGS. 6 and 8, it will be apparent that the fraction F1 is collected over the time from $T_0$ to $T_1$, the fraction F2 is collected from the time $T_1$ to $T_2$, while the fraction F3 is collected during the time $T_2$ to $T_3$. The specific times are not critical, but all fractions can be evolved and collected in a short period of time, such as a total time of 30 to 60 minutes from $T_0$ to $T_3$. The separate fractions are collected in relation to the desired concentrations of the product fractions F2, and the recycle fractions F1 and F3.

We claim:

1. The method of recovering a volatile liquid compound molecularly adsorbed within porous granules of a molecular sieve adsorbent from a dilute liquid solution thereof, said granules having a relatively low dielectric loss compared to that of the adsorbed liquid and being arranged in a bed contained in a column providing access port means communicating respectively with the upper and lower portions of the bed, said bed containing residual portions of the dilute liquid solution, comprising desorbing said liquid compound with the upper access port closed and the lower access port open so that gas pressure can be maintained in the bed upper portion and desorbed effluent can exit through the lower port, directionally applying microwave energy so as to heat the adsorbed liquid in the bed upper portions and to successive portions thereof, said bed at the start of said microwave application being at a temperature at which the adsorbed compound is in a liquid state, the amount of microwave energy applied to said bed upper portion and said successive portions thereof being sufficient to volatilize only part of the said desorbed compound, expelling the desorbed compound from said granules in a mixed liquid-gas form to provide an effluent, the gas portion creating a pressure within said bed which pushes the expelled liquid portion toward the lower port, and recovering the liquid-gas effluent by removal through a lower port.

2. The method of claim 1 in which first and second portions of the removed liquid-gas effluent are separately collected, the second portion having a substantially higher concentration of the desorbed compound than said first portion.

3. The method of claim 1 in which first, second, and third portions of the removed liquid-gas effluent are separately collected, the second portion having a substantially higher concentration of the desorbed compound than the first and third portions.

4. The method of recovering a volatile liquid compound molecularly adsorbed within porous granules of a molecular sieve adsorbent from a dilute liquid solution thereof, said granules having a relatively low dielectric loss compared to that of the adsorbed liquid and being arranged in a bed contained in a column providing head space above and collection space below the bed, upper access port means communicating with said head space, and lower access port means communicating with said collection space, said bed containing residual portions of said dilute liquid solution, comprising, with the upper port means closed and the lower port means open, directionally applying microwave energy to the bed upper portion and to successive portions thereof to selectively heat the adsorbed liquid compound within said granules for desorption thereof, the amount of applied microwave energy being sufficient to volatilize only part of the adsorbed compound within said granules to expell a liquid-gas effluent, said bed at the start of said microwave application being at a temperature at which the adsorbed compound is in a liquid state, the gas portion of the effluent creating a pressure in the bed upper portion pushing the effluent toward the bed lower portion, removing the liquid-gas effluent through a lower port, and separately collecting first and second portions of the removed liquid-gas effluent, said second portion having a substantially higher concentration of the desorbed compound than said first portion.

5. The method of claim 4 in which first, second, and third portions of the removed liquid gas effluent are separately collected, said second portion having a substantially higher concentration of the desorbed compound than said first and third portions.

6. The method of claim 4 in which said molecular sieve adsorbent is an adsorbent capable of adsorbing ethanol and said adsorbed volatile compound is ethanol.

7. The method of claim 4 in which said molecular sieve adsorbent is capable of adsorbing water and said adsorbed volatile compound is water.

8. The method of claim 4 in which first, second, and third portions of the removed effluent are separately collected, such second portion having a substantially higher concentration of the desorbed compound than said first and third portions.

9. The method of claim 4 in which said molecular sieve adsorbent is a silica polymorph.

10. The method of claim 4 in which said molecular sieve adsorbent is zeolite.

11. The method of claim 4 in which said molecular sieve adsorbent is a silica polymorph adsorbent capable of adsorbing ethanol and said adsorbed volatile compound is ethanol which has been adsorbed from a water solution thereof.

12. The method of claim 4 in which said molecular sieve adsorbent is a zeolite adsorbent capable of adsorbing water and said adsorbed volatile compound is water.

* * * * *